Feb. 18, 1964    J. J. CONOMOS ETAL    3,121,833
WARD-LEONARD ADJUSTABLE VOLTAGE MOTOR HOIST DRIVE
Filed June 27, 1961    4 Sheets-Sheet 1

WITNESSES

INVENTORS
James J. Conomos and
William R. Harding
BY
ATTORNEY

United States Patent Office 3,121,833
Patented Feb. 18, 1964

3,121,833
WARD-LEONARD ADJUSTABLE VOLTAGE MOTOR HOIST DRIVE
James J. Conomos, Buffalo, N.Y., and William R. Harding, Blacksburg, Va., assignors to Westinghouse Electric Corporation, East Pittsburgh, Pa., a corporation of Pennsylvania
Filed June 27, 1961, Ser. No. 119,975
16 Claims. (Cl. 318—145)

This invention relates to electric systems of control for driving an electric motor in either of two directions, and more specifically, this invention is directed to a variable voltage drive for a direct current motor coupled to drive a hoist, or cargo winch, or similar load, and which systems provide highly desirable and improved operating characteristics both for the hoisting of loads and for the lowering of loads.

It is one broad object of this invention to provide, in an adjustable voltage drive, operating characteristics that are superior to any herebefore obtained by apparatus for hoist, or cargo winch use and to at the same time obtain such superior operation with apparatus that has been simplified in number of needed components and which is more compact than previous cargo winch drives.

This invention provides new circuitry that is simpler and more dependable than circuitry heretofore known, but does not alone depend on the circuitry.

The expeditious loading and unloading of cargo calls for a drive containing many special features, as for example:
(1) Outstanding performance (both steady state and dynamic);
(2) High reliability;
(3) Maximum safety;
(4) Minimum weight;
(5) Minimum space occupancy;
(6) Ease of maintenance; and
(7) Flexibility (ease and range of use and adjustment).

The invention herein disclosed meets these requirements in an outstanding fashion without the use of regulators, feedback circuits, or artificial damping. Since this drive acquires its superiority as a "package" drive which incorporates many features, a listing of these features may be helpful:

(1) For this drive a high speed, low mass, low flux linkage generator is chosen. This generator has no radial or axial air ducts in its armature. This improves commutation on overloads and reduces the size of the generator to a minimum. This also permits the design of a generator, with the correct time constant, (as low time constant for field build-up) for obtaining maximum stability of operation and system response under all conditions.

(2) A compound wound direct current motor having a very small $WR^2$ is chosen. The $WR^2$ of the drive herein disclosed is about 50% of the $WR^2$ of previous motors for the same general load capacity. A low $WR^2$ of the motor is important for these reasons:

(A) The motor accelerating torque required to produce a given acceleration (or deceleration) over a certain speed range in a given time is a direct function of the total $WR^2$ of the system (motor $WR^2$ plus reflected load $WR^2$). Therefore, the lower the motor $WR^2$, the lower the torque required and the less the accelerating current peaks have to be. $WR^2$, here is the rotational inertia an armature of weight W has about its axis as a function of the square of its radius of gyration, R, with respect to this axis.

(3) Five point master switch giving five points hoisting and five points lowering.

(4) Improved brake with a reduced $WR^2$ of brake wheel. This reduced $WR^2$ enhances the ability of motor to accelerate and decelerate quickly.

(5) The use of a blocking diode so placed in the generator-motor loop circuit to prevent reverse flow of current in the motor series field during certain modes of transient and steady-state operation.

(6) The use of a generator killer field interconnected with an adjustable resistor.

(7) The use of a special bridge circuit by means of which positive (cumulative) generator series ampere-turns in the first three hoisting positions is obtained and negative (differential) ampere-turns in the fourth and fifth points hoisting is obtained. This results in proper shaping, for the most desirable operation, of the generator volt ampere curves. The polarity of the generator series ampere-turns is dictated by the opening, or closing, of contacts 21 which are closed for first, second and third hoist positions, producing cumulative ampere-turns, and open for fourth and fifth hoisting points, producing differential ampere-turns.

(8) The use of a timing relay which insures exceptional dynamic stability of the system, under any manner of operation and any load.

The foregoing are general discussions of this invention and the few objects stated are merely illustrative of the objects of this invention. Still other objects of this invention will become more apparent from a study of the following more detailed description and the drawings, in which.

Figure 1:
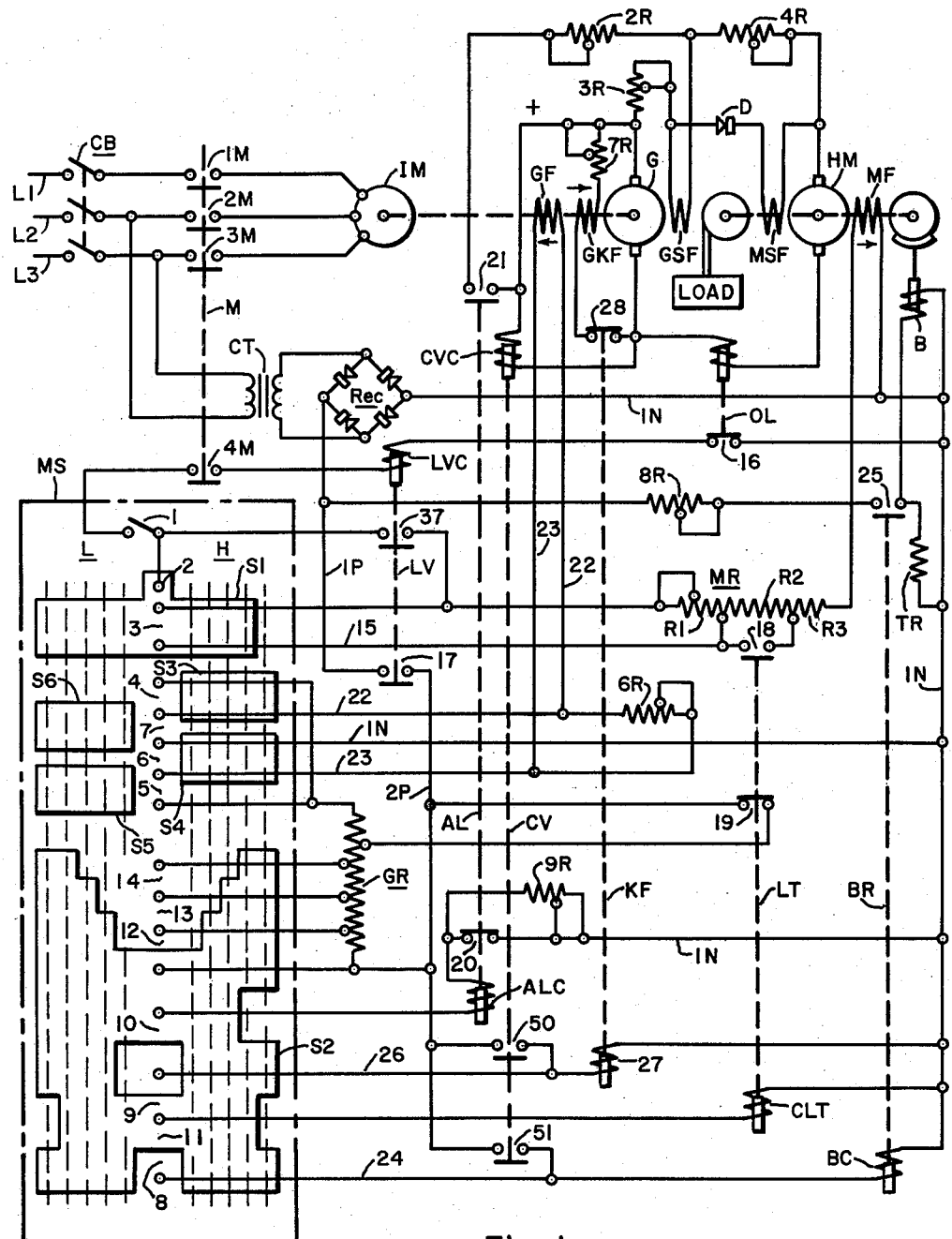
FIGURE 1 is a diagrammatic showing of a preferred embodiment of this invention.

A better understanding of this invention may be had from a study of typical operations for both the hoisting as well as the lowering of loads.

Assuming that leads L1, L2 and L3 are energized, that circuit breaker CB is closed and the master switch MS is in the position shown. When the circuit breaker CB is closed, the primary winding of the control transformer CT is energized, and the secondary winding supplies alternating current to the alternating current terminals of the full-wave rectifier Rec. The direct current terminals of the rectifier, through a suitable closed two-pole switch, not shown, thus supply a direct current potential to the leads 1P and 1N. The energization of leads 1P and 1N effects the energization of the shunt, or main, field MF of the hoist motor HM. The circuit may be traced from the positive lead 1P through contacts 3 bridged by segment S1 of the master switch MS, conductor 15, sections R2 and R3 of the motor rheostat MR, the motor field winding MF to the negative lead 1N. The motor field is thus energized before voltage is supplied to its armature. There is, thus, always the certainty of having fields strength in the motor when voltage is supplied to the motor.

To effect operation of the generator G, the main contactor M is caused to operate to close contacts 1M, 2M, 3M and 4M. The closure of the first three contacts starts the induction motor IM which thus, moments later, operates the generator G at full speed.

By closing the emergency switch 1 (the emergency switch is always closed except during an emergency) a circuit is established from 1P through contacts 2 bridged by segment S1, switch 1, contacts 4M, actuating coil LVC of the low voltage relay LV, the closed contacts 16 of over-load relay OL to lead 1N. The low voltage relay thus operates to close contacts 17 to thus energize lead 2P and energize segment S2 of the master switch MS.

The energization of segment S2 establishes a number of circuits. One circuit for the time limit relay LT may be traced from positive segment S2 through coil CLT to lead 1N. This relay LT picks up instantly to close contacts 18 and open contacts 19. The closure of contacts 18 removes rheostat section R2 from the motor field circuit thus providing for maximum motor excitation.

Another circuit is established, from segment S2 through contacts 10, the actuating coil ALC of relay AL, closed contacts 20 or relay AL to lead 1N. Relay AL picks up instantly to open contacts 20 and to close contacts 21. The opening of contacts 20 effects the insertion of resistor 9R in the coil circuit to hold the relay in on a much lower current. No further circuits are established except through operation of the master switch or controller MS. Further, the foregoing circuits are all established regardless of whether a load is to be hoisted or lowered.

Assuming a load is to be hoisted and the attendant moves the master switch to the first point hoist. This operation establishes a circuit from lead 2P, through all of the sections of the generator field rheostat GR, contacts 4 and segment S3 of the master switch, conductor 22, the generator main field winding GF energized in the direction indicated by the arrow adjacent the field winding, conductor 23, contacts 6 and segments S4 of the master switch, to lead 1N. A resistor 6R is connected directly across the conductors 22 and 23. This resistor 6R provides a field discharge resistor, but more importantly since the field winding is an inductive load on leads 22 and 23 resistor 6R aids in the smooth building up of the generator excitation. Also during reversals of the generator excitation when plugging this discharge resistor smooth, the transition by absorbing energy stored in the field. In addition, master switch contacts 4, 5, 6, 7 benefit because they are not subjected to the arcing they would experience if the field discharge resistance were not used.

Since all of the sections (of which there are five in this showing) of rheostat GR are in the field circuit, the generator voltage, even after build-up, will be rather low. The merits of this will become more apparent as the description proceeds.

In the first hoist position, and all subsequent hoist positions as well as the first lowering position and all subsequent lowering positions, the following circuit is established from contacts 8 and segment S2 through conductor 24, actuating coil BC of the brake relay or contactor BR to lead 1N. The brake relay or contactor, operates instantly to close contacts 25, whereupon a circuit is established from lead 1P through adjustable resistor 8R, contacts 25, the brake solenoid B to lead 1N. A resistor TR is connected in parallel to the brake solenoid B. This resistor TR provides protection to the brake coil by functioning as a discharge resistor when the coil is subjected to high voltage peaks. The brake, with the energization of its solenoid, is instantly released.

Another circuit established on the first point hoist may be traced from contacts 9 and segment S2 through conductor 26, the actuating coil 27 of the killer field relay KF to lead 1N. This relay operates instantly to open contact 28 to open the circuit of the generator killer field GKF which includes the adjustable resistor 7R.

The generator voltage, after the disappearance of transients, will be up to its nominal first point voltage which, for a 240 volt generator, might be somewhere in the neighborhood of no more than 80 volts.

Figure 3:
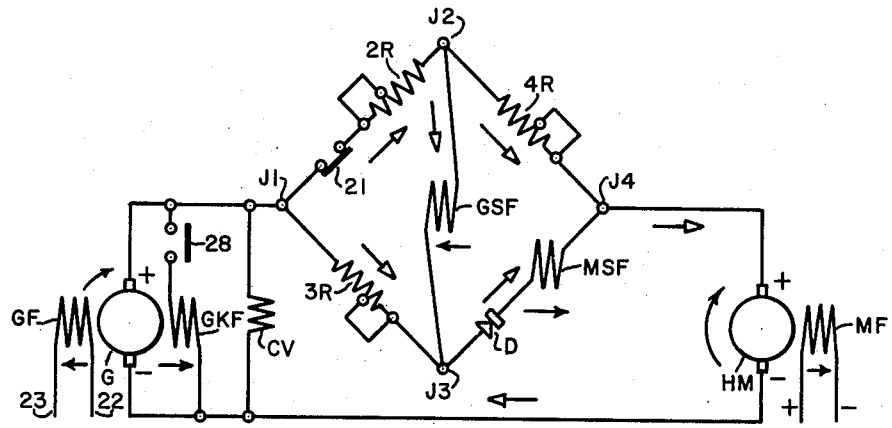
FIG. 3 is a simplified showing of the generator-motor loop circuit for hoisting.

Assuming the upper terminal of the generator, for the rotation indicated in FIG. 3, is positive then a current will flow in the motor-generator loop circuit as indicated by the arrows adjacent the conductors. At junction J1 of the Wheatstone bridge shown, the current will divide and flow through 2R and 3R, respectively. These two resistors may be designated legs one and three, respectively. It will be noted that resistors 2R, 3R and 4R, in legs one, three and two, respectively are made adjustable. The resistance values selected for these resistors may of course be somewhat different from each system of control but for an actual use, where the generator is a nominal 240 volt machine and the resistance values of the generator series field GSF is selected at .0312 ohm and the motor series field MSF is selected at .056 ohm, the resistance value selected for resistor 2R is in the range from .01 to .02 ohm, the resistance value selected for 3R is in the range from .02 to .04 ohm, and the resistance value selected for 4R is in the range from .04 to .08 ohm.

When 2R is at .01 ohm, 3R at .02 ohm, and 4R at .04 ohm, it can be shown that the current traversing the generator series field winding is from junction J2 toward junction J3 and that it is about 10% of the total motor load current. The generator series field winding, for the direction of current flow established, is so mounted that the series field acts cumulative to the action of the main field winding GF. This cumulative action of the two fields is indicated by the arrows adjacent the two field windings.

Since the current through the motor series field winding is the sum of the currents through 3R and GSF it is apparent that the motor series field winding will be heavily excited.

Since the motor series field is excited cumulative to the field of winding MF the motor torque will thus be high and the motor speed very low, but, since the generator shunt field is also excited and the generator series field excitation is cumulative and in proportion to motor load current, the motor will not stall but will slowly pick up and at low substantially constant speed operate heavy and light loads alike. This is readily apparent from curve 1H in the first quadrant QI of the curves shown in FIG. 2. At 100% torque, the curve is substantially horizontal and becomes more so as the torque rises above 100% torque. The load is thus moved may it be ever so heavy, nor does the motor on the first point hoist move a light load with excessive speed be it ever so light.

After the master controller is moved to the first point hoist, the energizing circuit for coil LVC of the low voltage relay is interrupted at contacts 3 and segment S1 but since the holding contacts 37 to relay LV are closed the relay remains energized and can only be deenergized by the opening of the emergency switch 1 or by voltage failure on leads 1P and 1N.

When the attendant moves the master switch to the second point hoist, the first section of the generator field rheostat is shunted at contact 12 by segment S2. The generator field GF becomes more heavily excited and a greater voltage is supplied to the motor armature. The operation of the load is now in accordance with the curve 2H shown in FIG. 2. Again it will be noted that the motor speed does not vary to a great extent, but a new, higher, near constant speed is attained. The speed does rise somewhat for the lighter loads. This is as it should be. Most important though is the fact that heavy loads are moved at a constant selected speed. The curve is horizontal for the heavier loads. There is thus no motor stall-out.

When the master switch is moved to the third hoist position, the first and second sections of the rheostat GR are shunted and the voltage of the generator is further increased. The winch motor now operates according to the showing of curve 3H shown in FIG. 2. This curve, it will be noted is somewhat steeper. The motor speed is now appreciably higher for the lighter loads but substantially at a fixed speed for the heavier loads. Further, there is no motor stall-out for the high loads.

When the contacts 21 are closed as they will be during the first, second and third hoist positions, the generator series field winding GSF is cumulative to the field winding GF. Thus, the generator voltage output rises slightly as a function of load, that is generator-motor loop circuit current, thus compensating for generator-motor loop IR voltage drop. This prevents the heavily compounded motor from stalling. The resultant speed torque curves are 1H, 2H and 3H shown in FIG. 2, which show the following highly desirable features:

(a) This drive can move any load, within its ultimate capability, on the first, second and third hoist positions.

(b) These three hoist points are essentially speed points; that is, speed is almost independent of load. This lends a high degree of predictability to the operation of the drive when the master switch is moved to these three first hoist positions.

When the master switch is moved to the fourth position, the first, second and third rheostat sections of rheostat GR are shunted and the voltage of the generator is further increased.

There is, however, an additional event that takes place during the fourth hoist position, namely, segment S2 opens the circuit for the coil ALC at contacts 10. This relay now drops out to open contacts 21 and close contacts 20. The opening of contact 21 takes the resistor 2R in the first leg of the bridge out of the circuit. All of the load current now flows through the resistor in the third leg of the bridge 3R and at junction J3 divides one part going through the diode D and the motor series field winding MSF connected in series with the diode and the fourth leg of the bridge, and the other part now flowing from junction J3 toward junction J2, through the generator series field winding in the reverse direction. The current is thus reversed in the generator series field with about half of the total load current now flowing in the generator series field in the differential direction. The interaction of the ampere-turns of the generator series field winding GSF with the ampere-turns of the main field winding GF shape the volt-ampere curves in such a manner that, together with the inherent regulation of a heavily compounded direct current motor, hoisting curves 4H and 5H are produced.

Curve 5H is further shaped by some events that take place upon movement of the master switch from the fourth hoist position to the fifth hoist position. Three events take place in rapid succession. First, the contacts 3 are no longer bridged by segment S1 thus inserting section R1 of the motor rheostat MR in the motor field circuit thus decreasing the motor field excitation; second, the actuating coil CLT of the time limit relay is deenergized at contacts 11 and segment S2; and third the time limit relay times out closing contacts 19 which shunts a fourth section of the generator rheostat causing a further rise in generator voltage, and thereafter opening contacts 18 to insert section R2 in the motor field rheostat to further decrease the motor field excitation.

Curve 5H is thus produced. These two curves 4H and 5H and more particularly 5H are essentially inverse speed-torque curves. These curves are thus ideal for hoisting applications since they tend toward constant horsepower, providing high light cable speeds and slower cable speeds for moving heavy leads. This is an additional safety feature as it is much more hazardous to personnel and cargo to move heavy loads at high speeds than at low speeds.

In a typical cargo winch operation when loading a ship from a dock, the load is hoisted, then luffed and slewed into position over the hold and the load then lowered. There are separate motors for effecting the luffing and the slewing.

Assuming the load has been hoisted and has been luffed and slewed into posiiton over the ship deck and no lowering of any distance is needed. In short all the attendant need do is to throw the master switch to the off position. When this is done, the excitation is removed from the generator main field.

The CV relay is a voltage sensitive relay having its actuating coil CVC connected across the generator terminals and adjusted to pick up at about first point hoisting voltage, say 80 volts. When the drive is put in first point hoist contacts 8 through segment S2 energizes coil BC of the brake relay BR, whose contacts 25 close, applying excitation to the brake coil B and contacts 9 bridged by segment S2 closes to energize coil 27 of the brake killer field contactor KF, whose contacts 28 open, disconnecting the generator killer field. The CV contacts 50 and 51 bypass both contacts 8 and 9. Thus, when the master switch is returned to the off position, the CV contacts 50 and 51 prevent the brake and killer field from being applied until the generator voltage has been reduced to some low value, say 80 volts. This permits full utilization of regeneration, makes the drive very smooth, and greatly reduces brake wear.

This drive is designed not to stall, but will lift any load put on it, up to the mechanical capabilities of the winch equipment. In order to save the equipment, the O.L. relay is of the instantaneous magnetic type and set to deenergize the drive at 300% torque (= to about 265% line current), is used. It preferably is of the automatic-re-set type which will reset when the operator moves the master switch to the off position, but most commonly is of the manual reset type, forcing the operator to reset it by hand.

When a load is to be lowered there are usually two stages to such lowering, namely power lowering and thereafter lowering an overhauling load. Since the load has inertia and the motor rotor has inertia, in short, all the parts moved by the motor have inertia, to get the very maximum speed of operation power lowering is employed for even very heavy loads. If only the hook and cables are the load, the attendant may throw the master switch from the hoist position it may hold, or if the master switch is in the off position throw the master switch from the off postion through the 1st, 2nd, 3rd and 4th to the 5th lowering position to obtain rapid hook movement. If the load is heavy a more cautious approach is preferable though not a necessity.

Assuming the load to be lowered is considerably more than the hook, that the master switch is in the off posittion, and lowering is to be effected. The attendant moves the master switch to the first point lowering, whereupon a circuit is established from conductor 2P through all of the resistor sections of the generator rheostat GR, contacts 5 bridged by segment S5 of the master switch MS, conductor 23, the generator field winding GF energizing the field winding GF in the direction opposite to that indicated by the arrow adjacent the winding GF in FIG. 1 but as indicated in FIGS. 4 and 5, conductor 22, contacts 7, bridged by segment S6 to conductor 1N.

All other circuits established on the first point hoist are also established except that the coil 27 of the killer field relay is not energized. This means that contacts 28 remain closed.

Figure 4:
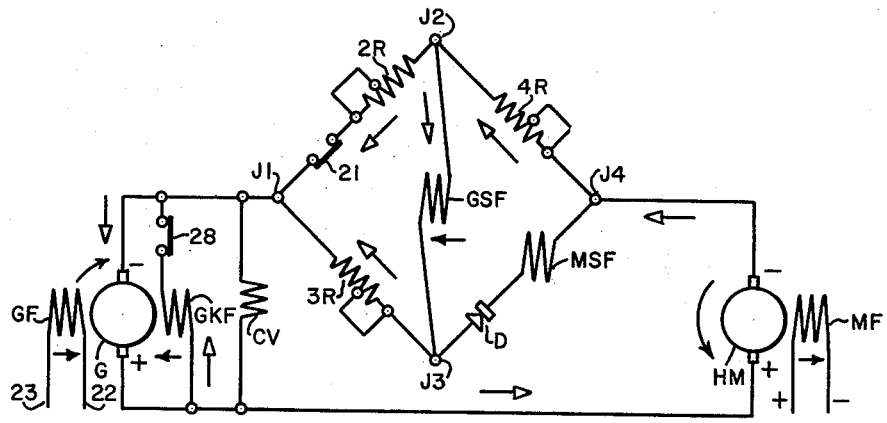
FIG. 4 is a showing like FIG. 3, but for power lowering.
Figure 5:
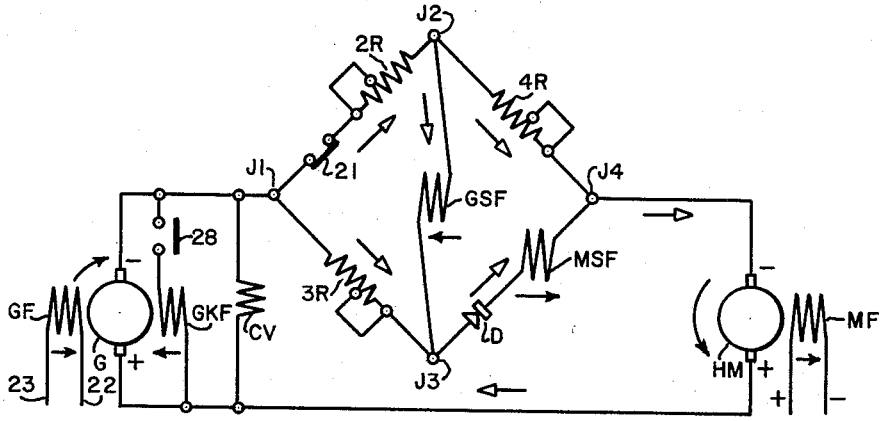
FIG. 5 is a showing like FIG. 3, but for lowering an overhauling load.

Since the generator polarity is now reversed the current in the generator-motor loop circuit is now as indicated adjacent the conductors in FIG. 4 During power lowering the blocking rectifier, or diode D prevents the reversed loop current from flowing in the motor series field winding MSF, to act differential to the main motor field winding MF. Such differential action of the motor series field, if permitted to flow, would significantly reduce the motor field flux thus negating its function as a torque-producing device. A much higher armature current would be required to produce the needed torque. Since no reverse current flows through the motor series field, the motor behaves like a shunt wound motor, with strong shunt field, producing sufficient torque for rapidly accelerating the motor armature and its coupled load to proper speed. Since contacts 21 are closed, the resistors 4R and 2R serve to carry the line current.

The blocking diode D is a highly reliable, low maintenance, piece of equipment because it consists of multiple selenium plates in parallel. These plates are selected to give a safety factor of 200% for both the current and back voltage capacity.

During power lowering on the first point lowering contacts 28 are closed. The generator killer field is thus energized and acts differentially to the main generator field winding. The small transient current in the generator series field winding is also differential. The generator voltage is thus initially kept rather low and thus produces a speed on the motor to provide a "soft," or slow landing or spotting speed.

On the second point lowering contacts 28 are opened deenergizing the killer field and in consequence the generator voltage is increased. The first section of the generator field rheostat is also shunted to further increase the generator voltage. The field control for the 3rd, 4th, and 5th point lowering for the generator is substantially the same as for hoisting with the time limit relay LT also caused to drop out on the fifth point lowering. Resistor section R1 in the motor field rheostat is, however, not inserted in the motor field winding circuit.

Power lowering is, however, usually a transitory operation. Usually, as soon as the motor armature is up to speed and the load up to speed the load becomes overhauling. The motor speed tends to increase when lowering any load and this increases the motor counter-electromotive force until it becomes greater than the generator voltage. The current, therefore, reverses in the generator-motor loop circuit. This is indicated in FIG. 5.

The current is thus in the same direction as during hoisting. This means current now flows through the motor series field MSF, and the ampere-turns are cumulative to those of the motor field MF. Since the motor is thus heavily excited, it develops a high retarding torque and a high counter-electromotive force. The motor torque now restrains the load from further acceleration in the downward direction and very stable operation results.

Figure 2:
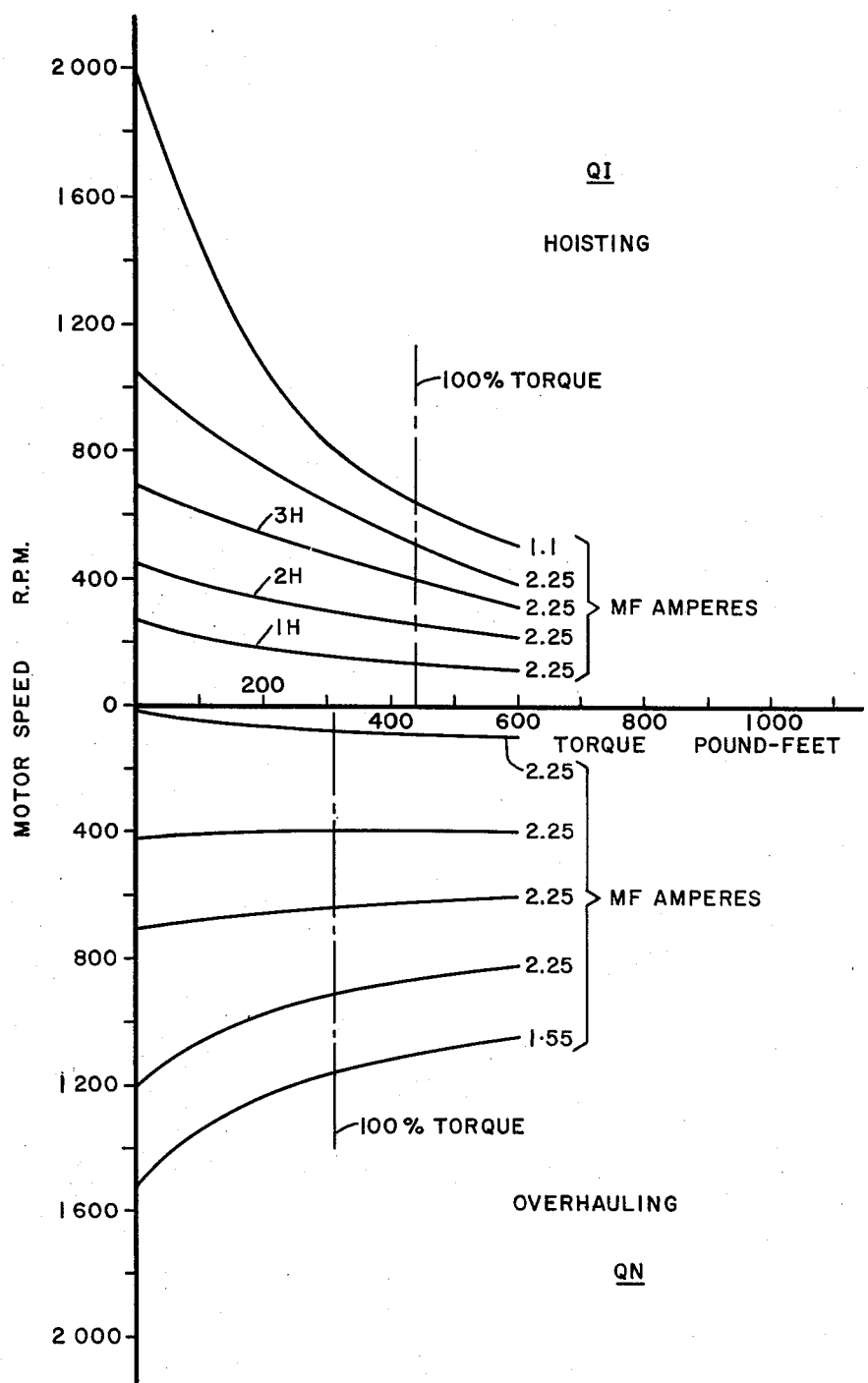
FIG. 2 shows the speed-torque load characteristics obtained by this invention, for both the hoisting operation and lower operation of a load.

The motor must, of course, now supply the losses. If the vertical broken line in the first quadrant, FIG. 2, represents 100% torque for a given load for all speed points, then the vertical broken line in the fourth quadrant, for the same load, is the 100% torque line during overhauling. For the same ordinal lowering positions the speeds will in each case be numerically somewhat higher. The motor runs faster for several reasons. First, its counter-electromotive force (C.E.M.F.) must be higher now that the motor (functioning as a generator) has to supply its own $IR+2$ voltage drop and the generator $IR+2$ voltage drop. Secondly, the generator voltage is increased because the M.G. set is running some small percent (say 5%) faster than synchronous speed. Thirdly, the motor must produce its C.E.M.F. at a somewhat lessened excitation, as the current in its series field is less when lowering a given load than when hoisting the same load because of the system inefficiencies. By increasing its speed, the motor produces the additional C.E.M.F. demanded by all three above points.

For an overhauling load the motor acts as a cumulatively compounded generator sending power to the generator which now runs as a shunt motor and drives the alternating current motor as an induction generator.

This operation is usually considered unstable. The total voltage produced by the motor is due to the shunt field plus the action of the series field, which is approximately $K_1/L$.

The induced voltage of the generator operating as a motor is $V_g$ due to the shunt field minus the reduction in voltage due to the load current $K_2/L$.

$$V_m + K_1/L - V_g + K_2/L - 1_L R - L\frac{di}{dt} - \int \frac{1}{C} 1 dt = 0$$

Where $C$ is the mechanical time constant of system $$L\frac{di}{dt} + (R - K_1 - K_2)1/L + \frac{1}{C}\int 1 dt = V_m - V_g$$

$$L\frac{d^21}{dt} + (R - K_1 - K_2)\frac{di}{dt} + \frac{1}{C} 1/L = 0$$

This system will be unstable when $(R - K_1 - K_2)$ is less than $$\sqrt{\frac{L}{C}}$$

As pointed out C has been reduced to a minimum but to secure the required performance $K_1 + K_2$ is much larger than R and the system is unstable.

In the past art (Harding and others) the angle between $K_1$ and R has been shifted by using a resistance shunting the series field of the motor causing the changing voltage to lag behind the changing current.

The practical limit of shifting the angle between $K_1$ and R limited the range and a load relay had to be used.

However, since the series field of the generator is connected in a bridge as shown in FIGURE 5 when the current is increasing part J3 will have a higher voltage than J2, due to the inductance of the series field of the motor and the flow of current through GSF will reverse.

By proper adjustment we can make $(R - K_1 - K_2)$ to be equal or larger than $$2\sqrt{\frac{L}{C}}$$

since $K_2$ is reversed and the angle between $R_1$ and $K_1$ is changed during transient. The greater the overhauling load, the higher the regenerated current and correspondingly, the higher the motor flux and voltage. Thus, more energy is pumped back into the system. For a given setting of the generator voltage, the increase in motor flux (due to load increase) causes the motor voltage to match the generator voltage at a lower speed; that is, heavier loads are lowered at lower speeds. This will be still more apparent from the speed torque curves of the fourth quadrant shown in FIG. 2.

By a choice of a proper ratio of shunt to series ampere-turns, significant reduction in motor and brake wheel $WR^2$, and the new circuitry herein disclosed, this system enables the apparatus to acquire high lowering speeds at light loads, slower speeds with increased loads, matching of hoisting and lowering speeds, and does so without the inclusion of load measuring means. The light line lowering speed is equal to about 85% of the light line hoisting speed and full load lowering speed is about 1.5 times full load hoisting speed. This is readily apparent from the fourth quadrant curves of FIG. 2.

Rapid acceleration and deceleration is obtained without sacrifice of high light line speeds. This is possible because the lower combined inertia of the motor and brake wheel, high commutating ability of the motor and generator, and the fast rising of the generator voltage to 140% of its normal value permit the attainment of rapid response and high light line speeds without excessive motor field weakening.

It should be noted that regardless of whether hoisting, power lowering, or overhauling operations are had the main generator-motor loop is never open, includes no switches and that the closing or opening of contacts 21 affects only part of the main armature current. This is important since it contributes significantly to the reliability and safety of this apparatus because the circuit, at all times, possesses its continuity and the energy levels handled by all relays and contactors are low, ensuring long, trouble-free life.

The stopping of the motor is fundamentally a question of how to absorb or dissipate the stored energy in the motor and its associated load. This problem, incidentally, was especially acute in constant voltage winch control systems in use heretofore and, which ruled out using regeneration because the reverse currents cause the motor series field to reduce or negate the motor flux. Thus, no regenerative braking torque was available, even though the current in the main armature loop was very large.

The new system of this invention is far superior to these old systems in stopping the motor. The diode D used in the new system prevents the flow of reverse current in the motor series field, thus permitting the shunt field to maintain a fairly substantial flux. This flux and the regenerative current in the armature loop, produces a positive braking torque which, in conjunction with the dynamic braking furnished by the armature loop resistance, quickly brings the load to a very slow speed without the use of the brake. The brake, therefore, is used basically as a holding device and as such its wear and need for maintenance is very low.

The use of a combination dynamic braking and killer generator field further enhances the safety both to load and personnel by quickly reducing the generator voltage to practically zero, which lowers the circulating current flowing in the main circuit to a small value. The brake, therefore, is not required to absorb torque from the motor when stopped but need be only capable of holding the load.

By designing most of the desired characteristics into the machines themselves, great smoothness of operation during plugging is also obtained. The time constants of the various fields, the proportion of ampere-turns between the different fields, the low $WR^2$ of the motor and brake wheel are all selected on this basis. Severe torque pulses with accompanying mechanical strains are not encountered.

When the master switch is moved from full speed hoisting to full speed lowering and back again after reaching full speed lowering, a most severe condition of operation, the performance of the equipment is smooth with no discernible hunting or oscillation and no harm to any of the electrical or mechanical components.

A drive of this kind must be designed so that failures do not endanger personnel, equipment or load. This new system has been found safe, and dependable under conditions of brake failure and power supply failure.

When the master switch is moved to the "off" position, the generator killer field and resistor are automatically applied after the CV relay opens when generator voltage drops below 100 volts. This forces the generator voltage to go rapidly to almost zero. Under this condition the motor functions as a saturated generator (constant flux) and the current will rise until it produces a torque sufficient to lower the load at low speed of 30 to 40 feet per minute. This is the equivalent of dropping the load from a height of less than 1/10 of an inch. Thus, if the brake should fail to set, or the circuit breaker CB opens, or both any load is automatically and safely lowered to the deck. This feature also makes it possible to load and unload cargo at normal rate, smoothly and safely, without ever using the brake, merely by manipulating the master switch handle.

If A.C. power fails, an interlock contact of the A.C. motor starter opens and drops out the lower voltage relay, which applies the generator killer field and resistor and causes the generator voltage to go down to near zero. Thus, the generator has little effect on the functioning of the winch motor as the generator armature merely carries the main line current.

The regenerative (overhauling) current passes through the motor series field in a direction to increase flux with increasing current (load). This increases the torque, and causes the motor to slow down, as it is required to generate only a relatively low C.E.M.F.

Since the induced generator voltage is almost zero, the drop across its terminals is due to the IR drop caused by the load current. This is about 5% of the full-load voltage. The heating of the killer field and resistor is therefore low and the important protective feature of lowering any load safely under conditions of total brake and power failure is obtained with only the killer field and a small resistor in series with it.

The stored kinetic energy of the winch motor and load is mostly dissipated in circuit resistance, with little left over for driving the MG set. The MG set generator operates as a motor with low field strength (the killer field and gen. series field both supplying some low value of ampere-turns) but subjected to only the low voltage developed across the killer field and its adjustable resistance. Therefore, it does not overspeed and the load is lowered at the steady speed of 30 to 40 feet per minute.

Figure 6:
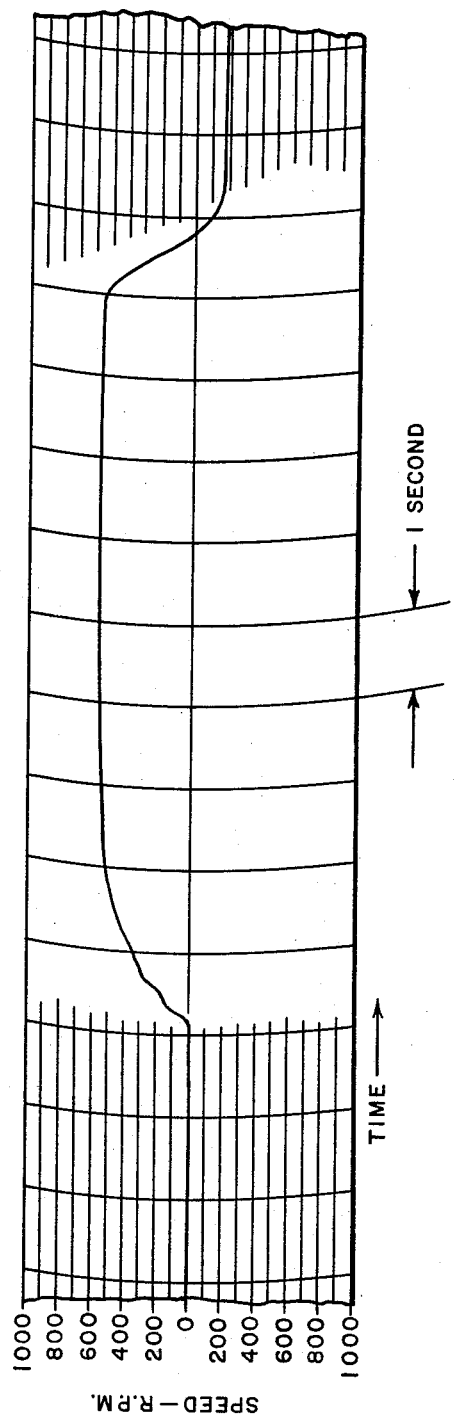
FIG. 6 shows the operating characteristic during starting of a heavy load and also the operating characteristic on simultaneous brake and power failure.

The oscillogram in FIG. 6 shows very clearly what happens when the brake is mechanically locked out and all A.C. power shut off and no external D.C. power supplied to any of the generator or motor shunt fields. Within 1½ seconds after power failure, the speed of the load was reduced to about 20% of full load lowering speed or about 40 feet per minute. This speed is "soft" enough to lower any cargo safely to the deck.

FIG. 2 shows (curve 1L in the lowering or fourth quadrant QIV) that any load can be lowered to the deck or dock at very low or "soft" landing speeds. For example, 3000# is lowered at 25 feet per minute, while 9000# is set down at 40 feet per minute. This is the same as dropping the load from heights of approximately .05 inch and .09 inch respectively.

The pump back or regeneration feature and the absence of the power circuit resistors and high resistor losses of previous D.C. systems and some present A.C. drives minimize power consumption for economical operation. The problem of heat dissipation is also minimized.

While but one embodiment has herein been described and shown by the drawings this invention is not limited to such single embodiment but modifications, particularly after having had the benefit of the teachings hereinbefore made, may be made falling within the scope of this invention.

We claim as our invention:

1. In a variable voltage control system for a direct current motor which may be coupled to drive a cargo winch, hoist, or other load having load characteristics generally similar to a cargo winch, or hoist, in combination, a generator having an armature winding, a main field winding, and a series field winding, a motor having an armature winding, a main field winding, and a series field winding, means for exciting the main field winding of the motor at a selected magnitude, generator main field winding excitation control means having an off position and a plurality of operating positions, rheostatic means for the generator main field winding, a pair of terminals energized with a direct current potential, said control means, when actuated from its off position, successively to the plurality of operating positions, cause the main field winding of the generator to be connected to said terminals for a certain direction of energization and cause the generator main field winding excitation to change from a relatively low value to successively higher values, said generator and motor armature windings being connected in a generator-motor loop circuit, said loop circuit including a Wheatstone bridge circuit having adjustable impedances in the first, second, and third legs respectively of the bridge, a diode and the motor series field winding in the fourth leg of the bridge, and the generator series field winding connected across the junctions between the first and second leg of the bridge and the junction between the third and fourth leg of the bridge, with the rest of the loop circuit including the generator armature winding and motor armature winding being connected to the junctions between the first and third leg of the bridge and the second and fourth leg of the bridge.

2. In a variable voltage control system for a direct current motor which may be coupled to drive a cargo winch, hoist, or other load having load characteristics generally similar to a cargo winch, or hoist, in combination, a generator having an armature winding, a main field winding, and a series field winding, a motor having an armature winding, a main field winding, and a series field winding, means for exciting the main field winding of the motor at a selected magnitude, generator main field winding excitation control means having an off position and a plurality of operating positions, rheostatic means for the generator main field winding, a pair of terminals energized with a direct current potential, said control means, when actuated from its off position, successively to the plurality of operating positions, cause the main field winding of the generator to be connected to said terminals for a certain direction of energization and cause the generator main field winding excitation to change from a relatively low value to successively higher values, said generator and motor armature windings being connected in a generator-motor loop circuit, said loop circuit including a Wheatstone bridge having adjustable impedances in the first, second, and third legs respectively of the bridge, a diode connected in series with the motor series field winding connected in the fourth leg of the bridge with the diode poled to conduct from the junction between the third and fourth leg of the bridge toward the junction between the second and fourth leg of the bridge, with one motor armature terminal connected to said last-mentioned junction and one generator armature terminal connected to the junction between the first and third leg of the bridge.

3. In a variable voltage control system for a direct current motor which may be coupled to drive a cargo winch, hoist, or other load having load characteristics generally similar to a cargo winch, or hoist, in combination, a generator having an armature winding, a main field winding, a series field winding, and a killer field winding, a motor having an armature winding, a main field winding, and a series field winding, means for exciting the main field winding of the motor at a selected magnitude, generator main field winding excitation control means having an off position and a plurality of operating positions, rheostatic means for the generator main field winding, a pair of terminals energized with a direct current potential, said control means, when actuated from its off position, successively to the plurality of operating positions, cause the main field winding of the generator to be connected to said terminals for a certain direction of energization and cause the generator main field winding excitation to change from a relatively low value to successively higher values, said generator and motor armature windings being connected in a generator-motor loop circuit, said loop circuit including a Wheatstone bridge having adjustable impedances in the first, second, and third legs respectively of the bridge, a diode connected in series with the motor series field winding connected in the fourth leg of the bridge with the diode poled to conduct from the junction between the third and fourth leg of the bridge toward the junction between the second and fourth leg of the bridge, with one motor armature terminal connected to said last-mentioned junction and one generator armature terminal connected to the junction between the first and third leg of the bridge, and control switching means, controlled by said generator main field winding excitation-control means, for connecting the killer field winding to the generator armature terminals during the off position of said control means and a certain selected operating position of said control means.

4. In a variable voltage drive including a control system for a direct current motor which may be coupled to drive a cargo winch, a hoist, or other loads which may have load characteristics generally similar to those of a cargo winch, in combination, a generator having an armature winding, a main field winding and a series field winding, a motor having an armature winding, a main field winding, and a series field winding, a rheostat for the main field winding of the motor, a rheostat for the main field winding of the generator, terminals energized at a suitable direct current potential from a suitable source of direct current power supply, means for connecting the motor main field winding through its rheostat to said terminals to excite the main motor field winding at a selected relatively high value, said generator armature winding and motor armature winding being connected in a loop circuit, said loop circuit including a Wheatstone bridge having a switch and an adjustable impedance in the first leg of the bridge, adjustable impedances respectively in the second and third legs of the bridge, a diode and the motor series field winding connected in series therewith disposed in the fourth leg of the bridge, and the generator series field winding connected across the junctions respectively between the first and second legs of the bridge and third and fourth legs of the bridge, said diode being poled to conduct toward one terminal of the motor armature winding connected to the junction between the second and fourth leg of the bridge, a master switch having an off position and a plurality of forward positions and a plurality of reverse positions, said master switch maintaining the switch in the first leg of the bridge closed in the off position and all other positions except the last two forward positions in which two last forward positions the master switch effects the opening of the switch in the first leg of the bridge.

5. In a variable voltage drive including a control system for a direct current motor which may be coupled to drive a cargo winch, a hoist, or other loads which may have load characteristics generally similar to those of a cargo winch, in combination, a generator having an armature winding, a main field winding, a series field winding, and a killer field winding including in its circuit switching means to connect and disconnect the killer field winding from the generator armature terminals, a motor having an armature winding, a main field winding, and a series field winding, a rheostat for the main field winding of the motor, a rheostat for the main field winding of the generator, terminals energized at a suitable direct current potential from a suitable source of direct current power supply, means for connecting the motor main field winding through its rheostat to said terminals to excite the main motor field winding at a selected relatively high value, said generator armature winding and motor armature winding being connected in a loop circuit, said loop circuit including a Wheatstone bridge having a switch and an adjustable impedance in the first leg of the bridge, adjustable impedances respectively in the second and third legs of the bridge, a diode and the motor series field winding connected in series therewith disposed in the fourth leg of the bridge, and the generator series field winding connected across the junctions respectively between the first and second legs of the bridge and third and fourth legs of the bridge, said diode being poled to conduct toward one terminal of the motor armature winding connected to the junction between the second and fourth leg of the bridge, a master switch having an off position and a plurality of forward positions and a plurality of reverse positions, said master switch maintaining the switching means in the killer field closed in the off position and the first reverse position, but open in all other positions.

6. In a variable voltage drive including a control system for a direct current motor which may be coupled to drive a cargo winch, a hoist, or other loads which may have load characteristics generally similar to those of a cargo winch, in combination, a generator having an armature winding, a main field winding, a series field winding, and a killer field winding including in its circuit switching means to connect and disconnect the killer field winding from the generator armature terminals, a motor having an armature winding, a main field winding, and a series field winding, a rheostat for the main field winding of the motor, a rheostat for the main field winding of the generator, terminals energized at a suitable direct current potential from a suitable source of direct current power supply, means for connecting the motor main field winding through its rheostat to said terminals to excite the main motor field winding at a selected relatively high value, said generator armature winding and motor armature winding being connected in a loop circuit, said loop circuit including a Wheatstone bridge having a switch and an adjustable impedance in the first leg of the bridge, adjustable impedances respectively in the second and third legs of the bridge, a diode and the motor series field winding connected in series therewith disposed in the fourth leg of the bridge, and the generator series field winding connected across the junctions respectively between the first and second legs of the bridge and third and fourth legs of the bridge, said diode being poled to conduct toward one terminal of the motor armature winding connected to the junction between the second and fourth leg of the bridge, a master switch having an off position and a plurality of forward positions and a plurality of reverse positions, said master switch also maintaining the swicthing means in the killer field closed in the off position and the first reverse position, but open in all other positions.

7. In a Ward-Leonard drive, in combination, a generator having an armature winding, a main field winding, and a series field winding, a motor having an armature winding, a main field winding, and a series field winding, a rheostat for the main field winding of the motor having at least three sections, a rheostat for the main field winding of the generator having at least five sections, terminals energized with direct current, a master switch including an off position and five forward positions, said master switch in the off position connecting the main field winding of the motor through one section of its rheostat to said terminals, said generator armature winding and motor armature winding being connected in a closed loop circuit, said loop circuit including a Wheatstone bridge having a switch and an adjustable resistor in one leg, an adjustable resistor in the second leg, an adjustable resistor in the third leg, and a diode and the motor series field winding in the fourth leg, said diode being poled to conduct from the junction between the third and fourth leg toward the junction between the second and fourth leg, said master switch upon movement from the off position to the fifth forward position effecting a rise in excitation of the main field winding of the generator by successive shunting of generator field rheostat sections and as it approaches the final position effects a successive shunting of two sections of the motor field rheostat, the generator excitation being such that the generator potential causes current to flow in the loop circuit so that the potential is positive at the junction between the first and third leg, the generator series field winding and motor series field windings both being cumulative with respect to the respective generator and motor main field windings, the adjustment of the resistors in the first, second and third leg of the bridge being such that a selected portion of the main motor load current flows through the generator series field winding.

8. In a Ward-Leonard drive, in combination, a generator having an armature winding, a main field winding, a series field winding, and a killer field winding including in its circuit an adjustable resistor and a switch for connecting and disconnecting the killer field winding and armature of the generator, a motor having an armature winding, a main field winding, and a series field winding, a rheostat for the main field winding of the motor having at least three three sections, a rheostat for the main field winding of the generator having at least five sections, terminals energized with direct current, a master switch including an off position and five forward positions, said master switch in the off position connecting the main field winding of the motor through one section of its rheostat to said terminals, said generator amature winding and motor armature winding being connected in a closed loop circuit, said loop circuit including a Wheatstone bridge having a switch and an adjustable resistor in one leg, an adjustable resistor in the second leg, an adjustable resistor in the third leg, and a diode and the motor series field winding in the fourth leg, said diode being poled to conduct from the junction between the third and fourth leg toward the junction between the second and fourth leg, said master switch upon movement from the off position to the fifth forward position effecting a rise in excitation of the main field winding of the generator by successive shunting of the generator field rheostat sections and as it approaches the final position effects a successive shunting of two sections of the motor field rheostat, the generator excitation being such that the generator potential causes current to flow in the loop circuit so that the potential is positive at the junction between the first and third leg, the generator series field winding and motor series field windings both being cumulative with respect to the respective generator and motor main field windings, and means operable to close the switch in the killer field circuit upon movement of the master switch back to the off position, the adjustment of the resistors in the first, second and third leg of the bridge being such that a selected portion of the main motor load current flows through the generator series field winding.

9. In a Ward-Leonard drive, in combination, a generator having an armature winding, a main field winding, and a series field winding, a motor having an armature winding, a main field winding, and a series field winding, a rheostat for the main field winding of the motor having at least three sections, a rheostat for the main field winding of the generator having at least five sections, terminals energized with direct current, a master switch including an off position and five forward positions, said master switch in the off position connecting the main field winding of the motor through one section of its rheostat to said terminals, said generator armature winding and motor armature winding being connected in a closed loop circuit, said loop circuit including a Wheatstone bridge having a switch and an adjustable resistor in one leg, an adjustable resistor in the second leg, an adjustable resistor in the third leg, and a diode and the motor series field winding in the fourth leg, said diode being poled to conduct from the junction between the third and fourth leg toward the junction between the second and fourth leg, said master switch upon movement from the off position to the fifth forward position effecting a rise in excitation of the main field winding of the generator by successive shunting of generator field rheostat sections and as it approaches the final position effects a successive shunting of two sections of the motor field rheostat, the generator excitation being such that the generator potential causes current to flow in the loop circuit so that the potential is positive at the junction between the first and third leg, the generator series field winding and motor series field windings both being cumulative with respect to the respective generator and motor main field windings, the adjustment of the resistors in the first, second and third leg of the bridge being such that a selected portion of the main motor load current flows through the generator series field winding, and means responsive to the operation of the master switch to the last two forward positions for effecting the opening of the switch in the first leg of the bridge.

10. In a Ward-Leonard drive, in combination, a generator having an armature winding, a main field winding, a series field winding, and a killer field winding including in its circuit an adjustable resistor and a switch for connecting and disconnecting the killer field winding and armature of the generator, a motor having an armature winding, a main field winding, and a series field winding, a rheostat for the main field winding of the motor having at least three sections, a rheostat for the main field winding of the generator having at least five sections, terminals energized with direct current, a master switch including an off position and five forward positions, said master switch in the off position connecting the main field winding of the motor through one section of its rheostat to said terminals, said generator armature winding and motor armature winding being connected in a closed loop circuit, said loop circuit including a Wheatstone bridge having a switch and an adjustable resistor in one leg, an adjustable resistor in the second leg, an adjustable resistor in the third leg, and a diode and the motor series field winding in the fourth leg, said diode being poled to conduct from the junction between the third and fourth leg toward the junction between the second and fourth leg, said master switch upon movement from the off position to the fifth forward position effecting a rise in excitation of the main field winding of the generator by successive shunting of generator field rheostat sections and as it approaches the final position effects a successive shunting of two sections of the motor field rheostat, the generator excitation being such that the generator potential causes current to flow in the loop circuit so that the potential is positive at the junction between the first and third leg, the generator series field winding and motor series field windings both cumulative with respect to the respective generator and motor main field windings, and means operable to close the switch in the killer field circuit upon movement of the master switch back to the off position, the adjustment of the resistors in the first, second and third leg of the bridge being such that a selected portion of the main motor load current flow through the generator series field winding, and means responsive to the operation of the master switch to the last two forward positions for effecting the opening of the switch in the first leg of the bridge.

11. In a Ward-Leonard drive, in combination, a generator having an armature winding, a main field winding, and a series field winding, a motor having an armature winding, a main field winding, and a series field winding, rheostatic means for the respective main field windings of the generator and motor, a master switch having an off position and a plurality of reverse motor speed positions terminals energized with a suitable direct current potential, said master switch in coaction with said terminals and rheostatic means for the main motor field winding effecting a maximum main motor field excitation for the off position and all reverse positions and for effecting a rise in generator main field excitation from the first to near the last position, said motor and generator armature windings being connected in a closed loop circuit including a Wheatstone bridge having a control switch and adjustable impedance in the first leg, adjustable impedances in the second and third legs, and a diode and the motor series field winding in the fourth leg, and the generator series field winding connected across the junctions between the first and second leg and third and fourth leg, the diode being poled to conduct from the junction between the third and fourth leg toward the junction between the second and fourth leg, the master switch, in cooperation with said terminals and in the absence of regenerative voltages of the motor greater than the generator voltage, providing a generator excitation to cause current to flow in said bridge from the junction between the second and fourth leg toward the junction between the first and third leg.

12. In a Ward-Leonard drive, in combination, a generator having an armature winding, a main field winding, and a series field winding, and a killer field winding, a motor having an armature winding, a main field winding, and a series field winding, rheostatic means for the respective main field windings of the generator and motor, a master switch having an off position and a plurality of reverse motor speed positions, terminals energized with a suitable direct current potential, said master switch in coaction with said terminals and rheostatic means for the main motor field winding effecting a maximum main motor field excitation for the off position and all reverse positions and for effecting a rise in generator main field excitation from the first to near the last position and for connecting the killer field to the generator armature winding in the off position and first reverse position, said motor and generator armature windings being connected in a closed loop circuit including a Wheatstone bridge having a control switch and adjustable impedance in the first leg, adjustable impedances in the second and third legs, and a diode and the motor series field winding in the fourth leg, and the generator series field winding connected across the junctions between the first and second leg and third and fourth leg, the diode being poled to conduct from the junction between the third and fourth leg toward the junction between the second and fourth leg, the master switch, in cooperation with said terminals and in the absence of regenerative voltages of the motor greater than the generator voltage, providing a generator excitation to cause current to flow in said bridge from the junction between the second and fourth leg toward the junction between the first and third leg.

13. In a variable voltage drive including a control system for a direct current motor, in combination, a generator having an armature winding, a main field winding, and a series field winding, a motor having an armature winding, a main field winding, and a series field winding; and three resistors; with said three resistors and the generator series field winding and the motor series field winding being connected to form a Wheatstone bridge circuit having the motor series field winding comprising one leg of that bridge, and the generator series field winding being connected across said bridge.

14. In a variable voltage drive including a control system for a direct current motor, in combination, a generator having an armature winding, a main field winding, and a series field winding, a motor having an armature winding, a main field winding, and a series field winding; three resistors; with said three resistors and motor series field winding being connected respectively to form the four legs of a Wheatstone bridge; and said generator series field winding being connected across the junction between a pair of said resistors forming two legs of the bridge and the junction between the third resistor and the motor series field winding.

15. In a variable voltage drive including a control system for a direct current motor, in combination, a generator having an armature winding, a main field winding, and a series field winding, a motor having an armature winding, a main field winding, and a series field winding; and three resistors, said three resistors and motor series field winding being connected respectively to form the four legs of a Wheatstone bridge circuit, with the generator series field winding being connected from a first junction between a pair of resistors forming two legs of the bridge to a second junction between the third resistor and the motor series field winding, said motor armature winding and the generator armature winding being connected with said bridge circuit in a series loop circuit.

16. In a Ward-Leonard circuit, a generator having an armature winding, a series field winding, and a controllable main field winding, a motor having an armature winding, a series field winding and a main field winding, three members, a loop circuit including the motor and generator armature windings and a bridge circuit having a first branch including two impedances connected in series and a second branch including one impedance and the motor series field winding connected in series and connected in shunt relation to said first branch including said two impedances connected in series, with said generator series field winding being connected across the junction between the series connected two impedances and the junction between the third impedance and the motor series field winding.

References Cited in the file of this patent
UNITED STATES PATENTS

| | | |
|---|---|---|
| 2,303,457 | Harding et al. | Dec. 1, 1942 |
| 2,468,117 | Schaelchlin et al. | Apr. 26, 1949 |
| 2,785,362 | Harding et al. | Mar. 12, 1957 |